United States Patent Office 3,438,930
Patented Apr. 15, 1969

3,438,930
ALKOXYHYDROXY-TERMINATED POLYDI-
ORGANOSILOXANES CURABLE AT ROOM
TEMPERATURE
Melvin D. Beers, Schenectady, N.Y., assignor to General
Electric Company, a corporation of New York
No Drawing. Filed May 1, 1967, Ser. No. 634,828
Int. Cl. C08g 47/02, 51/02, 51/08
U.S. Cl. 260—37   10 Claims

ABSTRACT OF THE DISCLOSURE

Organopolysiloxane compositions curable at room temperature to the elastomeric state upon exposure to moisture, in the form of the reaction product of a silane having three hydrolyzable radicals attached to silicon and a polydiorganosiloxane terminated with a mixture of silanol radicals and tert-alkoxy radicals. Elastomers resulting from the cure of these compositions exhibit superior toughness and improved adhesion to various substrates.

---

Prior to the present invention, curable organopolysiloxane compositions were available, as shown by Bruner Patent 3,077,465, which are convertible to the elastomeric state upon exposure to moisture at room temperature. Although such elastomers are useful in certain applications, they lack toughness and do not adhere well to various substrates unless they are previously primed. As shown by Smith et al., Patent 3,293,204, assigned to the same assignee as the present invention, improved results were achieved with respect to adhesion to metal substrates by incorporating into the curable organopolysiloxane composition, a certain methoxy-stopped copolymer as an adhesion additive. However, the resulting elastomers are still deficient in toughness, which hereinafter will signify the ability of an elastomer to satisfactorily resist abrasion, as well as continuous stress and strain. For example, elastomers having a satisfactory degree of toughness within the meaning of the present invention, can be employed in applications requiring materials capable of being subjected to continuous stress, such as expansion joints used in building construction. Toughness of an elastomer can be shown by measuring its tear strength (p.i.). Another means of measuring toughness of an elastomer is by determining its tensile-product, "TP," which is defined as follows $$TP = T \times E$$

where T is tensile strength (p.s.i.) and E is elongation (percent).

The present invention is based on the discovery that organopolysiloxane compositions comprising the reaction product of a hydrolyzable silane of the formula:

(1) $\quad\quad\quad\quad RSiY_3$ and an organopolysiloxane polymer terminated with a mixture of silanol radicals and tert-alkoxy radicals, can provide for elastomers exhibiting superior toughness and adhesion to a variety of unprimed substrates, where Y of Formula 1 is a hydrolyzable radical, R is selected from monovalent hydrocarbon radicals, halogenated monovalent hydrocarbon radicals and $R_3'CO$ radicals, and R' is an alkyl radical.

The room temperature curable compositions of the present invention more particularly comprise (A) 100 parts of a tert-alkoxyorganopolysiloxane consisting essentially of chemically combined units of the formula:

(2) $\quad\quad\quad\quad R_2''SiO$ terminated with a mixture of (a) tert-alkoxydiorgano-siloxy units of the formula:

(3) $\quad\quad\quad\quad (R_3'CO)R_2''SiO_{0.5}$ and (b) hydroxydiorganosiloxy units of the formula:

(4) $\quad\quad\quad\quad (HO)R_2''SiO_{0.5}$ where the ratio of (a) to (b) has a value less than one, and (B) from 2 to 30 parts of the silane of Formula 1 where R' is defined above, and R'' is a member selected from monovalent hydrocarbon radicals, halogenated monovalent hydrocarbon radicals, and cyanoalkyl radicals.

Radicals included by R of Formula 1 are aryl radicals, such as phenyl, tolyl, xylyl; haloaryl radicals such as chlorophenyl, bromotolyl, chloronapthyl, etc.; alkyl and cycloalkyl radicals such as methyl, ethyl, chloropropyl, butyl, amyl, cyclohexyl, etc.; alkenyl radicals and cycloalkenyl radicals such as vinyl, allyl, 1-propenyl, cyclohexenyl, etc.; tertiary alkoxy radicals such as tertiary-butoxy, tertiary-amyloxy, triethylcarbinoxy, etc. Radicals included by R' are all of the aforementioned alkyl radicals included by R. Radicals included by R'' are all of the aforementioned monovalent hydrocarbon radicals and halogenated monovalent hydrocarbon radicals included by R, as well as cyanoalkyl radicals, such as cyanoethyl, cyanopropyl, cyanobutyl, etc. Radicals included by Y of Formula 1 are, for example, halogen radicals such as fluoro, bromo, etc.; acyloxy radicals such as formoxy, acetoxy, propionoxy, butyryloxy, etc.; amino radicals such as ethylamino, dimethylamino, isopropylamino, ethylamino, diethylamino, butylamino, etc.; aminoxy radicals such as dimethylaminoxy, diethylaminoxy, methylethylaminoxy, etc.; isothiocyanato radicals, carbamato radicals, ketoximato radicals, etc.

Hydrolyzable silanes included by Formula 1 are, for example methyltrichlorosilane,
phenyltrichlorosilane, etc.;
methyltriacetoxysilane,
phenyltriacetoxysilane,
tris(acetoxy)tert-butoxysilane,
tris(propionoxy)tert-amyloxysilane, etc.;
tris(dimethylamino)methylsilane,
tris(isopropylamino)phenylsilane,
tris(diethylamino)tert-butoxysilane, etc.;
tris(diethylaminoxy)methylsilane,
tris(diethylaminoxy)phenylsilane,
tris(diethylaminoxy)tert-butoxysilane, etc.;
tris(isothiocyanato)methylsilane,
tris(isothiocyanato)phenylsilane,
tris(isothiocyanato)tert-butoxysilane, etc.;
tris(carabmato)methylsilane,
tris(carbamato)phenylsilane,
tris(carbamato)tert-butoxysilane, etc.;
tris(ketoximato)methylsilane,
tris(ketoximato)phenylsilane,
tris(ketoximato)tert-butoxysilane, etc.

The organopolysiloxane polymer consisting essentially of chemically combined units of Formula 2 and terminated with a mixture of units of Formulae 3 and 4, referred to hereinafter as the "tert-alkoxyorganopolysiloxane," can be made by mixing together a silanol-terminated polydiorganosiloxane of the formula, (5) 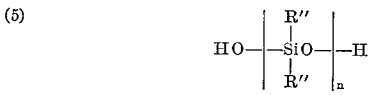

with an amount of tert-alkoxydiorganosiloxane of the formula, (6) $(R_3'CO)R_2''SiY$ which is sufficient to react with available silanol radicals of the silanol-terminated polydiorganosiloxane Formula 5, to provide for a ratio of tert-alkoxydiorganosiloxy units of Formula 3, to hydroxydiorganosiloxy units of Formula 4, having a value less than one, where R', R'', and Y are as previously defined and $n$ is an integer equal to about 5 to about 1500 inclusive.

Mixing of the silanol-terminated polydiorganosiloxane of Formula 5 and the tert-alkoxydiorganosilane of Formula 6 is preferably done under substantially anhydrous conditions to avoid excessive hydrolysis of the hydrolyzable radicals of the tert-alkoxydiorganosilane. Experience has shown that a proportion of from 0.05 mole to 0.91 mole of tert-alkoxydiorganosilane, per mole of silanol radical of the silanol-terminated polydiorganosiloxane can be employed. Mixing of the aforementioned ingredients can be accomplished at temperatures in the range of between 0° C. to 200° C. Effective results can be achieved if sufficient tert-alkoxydiorganosilane of Formula 6 is utilized in combination with the silanol-terminated polydiorganosiloxane of Formula 5 to provide for an organopolysiloxane polymer having a ratio of tert-alkoxydiorganosiloxy radicals of Formula 2, to diorganohydroxysiloxy radicals of Formula 3 which has a value between 0.05 to 0.9, and preferably 0.2 to 0.8.

There are included by the tert-alkoxydiorganosilanes of Formula 6, tert-amyloxydimethylisopropylaminosilane, tert-amyloxydimethyl(diethylaminoxy)silane, tert-butoxydimethyl(isopropylamino)silane, tert-butoxydimethyl(diethylaminoxy)silane, tert-butoxydimethylacetoxysilane, etc.

Silanol-terminated polydiorganosiloxanes included by Formula 5 preferably have a viscosity in the range of from about 100 centipoises to 2,000,000 centipoises when measured at 25° C. These silanol polymers can be made by treating a polydiorganosiloxane such as a polydimethylsiloxane with water to reduce the viscosity of the polymer to within a predetermined range. Cyclopolydiorganosiloxane, for example, octamethylcyclotetrasiloxane, can be employed to make the silanol-terminated polydiorganosiloxanes by conventional equilibration procedures such as by heating to about 150° C.–200° C., with a base catalyst. Water can be added to the resulting high molecular weight polymer while the mixture is heated.

The room temperature curable compositions of the present invention can be made by mixing the tert-alkoxyorganopolysiloxane and hydrolyzable silane of Formula 1 under substantially anhydrous conditions. There also can be utilized in combination with the aforementioned ingredients, filler, pigments, curing accelerators, heat-age additives, etc.

In making the room temperature curable compositions, the order of addition of the various ingredients is not critical. A proportion of from 10 to 300 parts of filler, per 100 parts of the tert-alkoxyorganopolysiloxane polymer will provide for effective results. Suitable fillers include, for example, fumed silica, precipitated silica, fumed titanium dioxide, etc. In addition, non-reinforcing fillers, such as titanium oxide, ground quartz, iron oxide, etc., also can be employed if desired. The choice of a suitable filler will depend in part upon the nature of the hydrolyzable silane employed. Basic fillers preferably are utilized in combination with aminosilanes or aminoxysilanes. Curing accelerators which can be employed include, for example, dibutyltindilaurate, zinc octoate, lead acetate, etc. A proportion of up to 0.5% of curing accelerator, based on the weight of the curable composition will provide for effective results.

It has been found that the curable compositions of the present invention will remain in a fluid state for a period of one year or more, if protected from atmospheric moisture at a temperature between 0° C. to 60° C.

The curable compositions of the present invention can be advantageously employed as sealants, encapsulants, caulking compounds, expansion joints for buildings, etc.

In order that those skilled in the art will be better able to practice the invention, the following examples are given by way of illustration and not by way of limitation. All parts are by weight.

EXAMPLE 1

There was added 0.35 part of tert-butoxydimethylacetoxysilane to 100 parts of a silanol-terminated polydimethylsiloxane having a viscosity of about 2600 centipoises at 25° C. The addition was performed with stirring at a temperature of about 100° C. The resulting mixture was then purged with nitrogen under reduced pressure to effect the removal of volatiles. There was obtained a tert-butoxypolydimethylsiloxane having a ratio of terminal

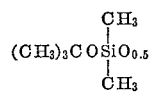

units to $HO(CH_3)_2SiO_{0.5}$ units of about 0.3.

There was added under substantially anhydrous conditions, 4.0 parts of methyltriacetoxysilane to a mixture of 77 parts of the above tert-butoxypolydimethylsiloxane, 2.3 parts of fumed silica and 0.01 part of dibutyltindilaurate.

In addition to the above curable composition prepared in accordance with the method of the present invention, another curable composition was made following the same procedure except the above-described silanol-terminated polydimethylsiloxane was employed in place of the tert-butoxypolydimethylsiloxane.

Each of the above curable compositions were spread onto an aluminum panel to a height of about 0.02 inch. A section of wire mesh screen was then embedded into each of the compositions. The screens were each covered with an additional 0.02 inch of compositions. After the respective compositions cured, the aluminum panel and screen were pulled in opposite directions at a predetermined rate. Shear adhesion (p.s.i.) was measured on a Tinius-Olson tester by pulling the screen and aluminum panel at a rate of 0.5 inch per minute. Cohesive failure (percent) indicates the degree to which the bond between rubber and metal was maintained. One hundred percent cohesive failure, for example, shows that the rubber completely broke down before any separation was effected between metal and rubber. Zero cohesive failure indicates a clean separation between metal and rubber. In other words, the resulting surface of the metal is free of rubber.

Results of shear adhesion and cohesive failure of the composites made from the silanol-terminated polydimethylsiloxane "control" and the tert-butoxypolydimethylsiloxane, "tert-alkoxy," are shown in the table below. In addition, the toughness of slabs obtained from the respective compositions after 48 hours cure at 25° C. under atmospheric conditions, also is shown, where T (tear) is in (p.i.), and TP (tensile product $\times 10^4$) is a factor obtained from the product of tensile (p.s.i.) and elongation (percent).

|  | Shear adhesion (p.s.i.) | Cohesive failure (percent) | 48 hrs./25° C. | |
|---|---|---|---|---|
|  |  |  | T (p.i.) | TP (×10⁴) |
| Control | 320 | 100 | 68 | 16.9 |
| Tert-alkoxy | ¹ 375 |  | 85 | 27.7 |

¹ Screen broke.

EXAMPLE 2

A tert-butoxypolydimethylsiloxane having a viscosity of 2500 centipoises at 25° C. was prepared in accordance with the procedure of Example 1. The ratio of

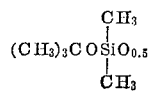

units to $HO(CH_3)SiO_{0.5}$ units had a value of 0.36. It was mixed with methyltriacetoxysilane and carbon black. The resulting curable composition contained 4 parts of methyltriacetoxysilane, and 30 parts of carbon black per 100 parts of tert-butoxypolydimethylsiloxane.

A portion of the above curable composition was spread onto an aluminum panel, and embedded with a wire mesh screen in accordance with the procedure of Example 1. A control also was prepared utilizing a silanol-terminated polydimethylsiloxane having the same viscosity as the above-described tert-butoxypolydimethylsiloxane. Shear adhesion, tear, and toughness values, as defined in Example 1, are shown as follows:

|  | Shear adhesion (p.s.i.) | Cohesive failure (percent) | 48 hrs./25° C. | |
|---|---|---|---|---|
|  |  |  | T (p.i.) | TP ($\times 10^4$) |
| Control | 150 | 0 | 70 | 11.7 |
| Tert-alkoxy | 200 | 80 | 86 | 25.75 |

EXAMPLE 3

Following the procedure of Example 2, a curable composition was prepared in accordance with the practice of the present invention, containing 35 parts of aluminum oxide filler in place of the carbon black. A control composition also was prepared containing 35 parts of aluminum oxide filler, per 100 parts of a silanol-terminated polymer. Tear and toughness values obtained from the compositions of the present invention and the control are shown as follows:

|  | 48 hrs./25° C. | |
|---|---|---|
|  | T (p.i.) | TP ($\times 10^4$) |
| Control | 69 | 24 |
| Tert-alkoxy | 90 | 33.8 |

EXAMPLE 4

A tert-butoxypolydimethylsiloxane having a ratio of terminal tert-butoxymethylsiloxy units to terminal silanol units of a value of 0.5 and a viscosity of 10,300 centipoises at 25° C. was prepared in accordance with the practice of the invention. There was blended together 30 parts of fumed silica per 100 parts of tert-butoxy polymer. Sufficient tert-butoxytriacetoxysilane was then added to the resulting blend to provide for a ratio of 5 parts of tert-butoxytriacetoxysilane, per 100 parts of the blend. A control mixture was also prepared following the same procedure except that in place of the tert-butoxypolydimethylsiloxane there was employed a silanol-terminated polydimethylsiloxane having about the same viscosity.

Composites were then prepared from the above compositions following the procedure of Example 1. The table below shows the results obtained.

|  | Shear adhesion (p.s.i.) | Cohesive failure (percent) | 48 hrs./25° C. | |
|---|---|---|---|---|
|  |  |  | T (p.i.) | TP ($\times 10^4$) |
| Control | 150 | 40 | 60 | 13.3 |
| Tert-alkoxy | 240 | 100 | 85 | 31.6 |

Based on the above results those skilled in the art would know that the compositions of the present invention provide for the production of metal-rubber composites having superior strength as compared to the composites made from prior art compositions. In addition, the resulting elastomers made from the compositions of the present invention exhibit superior toughness and adhesion to metal as compared to prior art compositions.

While the foregoing examples have of necessity been limited to only a few of the many variables within the scope of the present invention, it should be understood that the present invention covers a much broader class of curable organopolysiloxane compositions which can be made by effecting reaction between the hydrolyzable silane of Formula 1 and tert-alkoxyorganopolysiloxane consisting essentially of units of Formula 2 and terminated with units of Formulae 3 and 4.

What I claim as new and desire to secure by Letters Patent of the United States is:

1. A curable composition comprising (A) 100 parts of a tert-alkoxyorganopolysiloxane consisting essentially of chemically combined units of the formula:

$$R_2''SiO$$

terminated with a mixture of (a) tert-alkoxydiorganosiloxy units of the formula:

$$(R_3'CO)R_2''SiO_{0.5}$$

and (b) hydroxydiorganosiloxy units of the formula:

$$(HO)R_2''SiO_{0.5}$$

where the ratio of (a) to (b) has a value of less than one, and (B) from 2 to 30 parts of hydrolyzable silane of the formula:

$$RSiY_3$$

where R is a member selected from the class consisting of monovalent hydrocarbon radicals, helogenated monovalent hydrocarbon radicals, and $R_3'CO$ radicals, R' is an alkyl radical, R'' is a member selected from a class consisting of monovalent hydrocarbon radicals, halogenate monovalent hydrocarbon radicals, and cyanoalkyl radicals, and Y is a hydrolyzable radical.

2. A composition in accordance with claim 1, where the hydrolyzable silane is methyltriacetoxysilane.

3. A composition in accordance with claim 1, where the hydrolyzable silane is tert-butoxytriacetoxysilane.

4. A composition in accordance with claim 1, containing filler.

5. A composition in accordance with claim 1, where said tert-alkoxyorganopolysiloxane consists essentially of chemically combined dimethylsiloxy units.

6. A composition in accordance with claim 1, where said tert-alkoxyorganopolysiloxane has terminal tert-butoxydimethylsiloxy units.

7. A curable composition in accordance with claim 1, comprising (A) 100 parts of a tert-butoxymethylpolysiloxane consisting essentially of chemically combined dimethylsiloxy units terminated with a mixture of (a) tert-butoxydimethylsiloxy units and (b) dimethylhydroxysiloxy units where the ratio of (a) to (b) has a value between 0.05 to 0.9 and (B) from 2 to 30 parts of methyltriacetoxysilane and (C) from 10 to 300 parts of filler.

8. A composition in accordance with claim 1, containing a fumed silica filler.

9. A composition in accordance with claim 1 containing a carbon black filler.

10. A composition in accordance with claim 1, containing an aluminum oxide filler.

References Cited

UNITED STATES PATENTS 3,065,194  11/1962  Nitzsche et al. ____ 260—46.5 X
3,205,197   9/1965  Cohen et al.
3,261,807   7/1966  Bluestein _____ 260—46.5

MORRIS LIEBMAN, *Primary Examiner.*

L. T. JACOBS, *Assistant Examiner.*

U.S. Cl. X.R.

260—46.5